Sept. 15, 1953
J. H. BRALEY
2,651,893
TIRE SHAPING MACHINE
Filed June 16, 1950
5 Sheets-Sheet 1
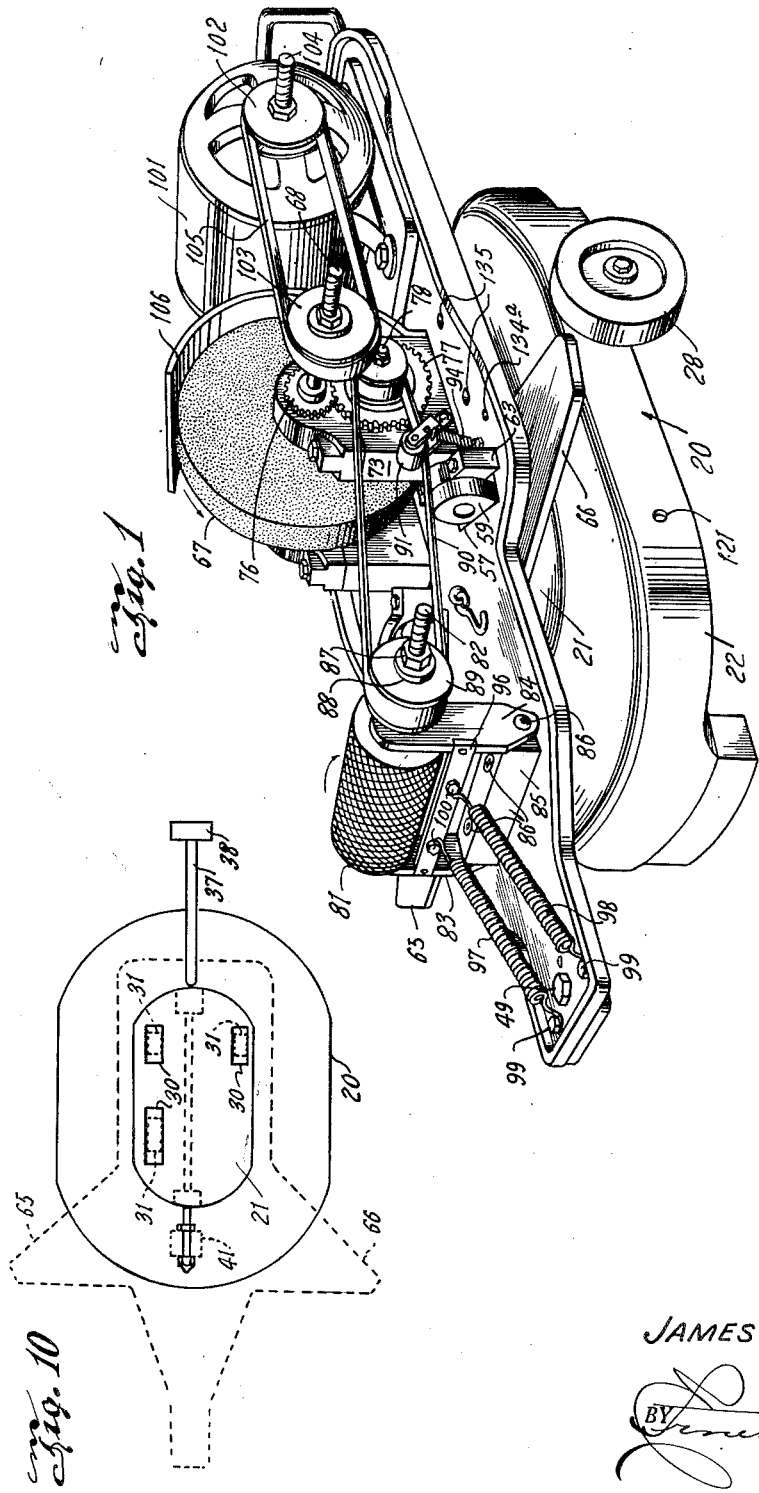
JAMES H. BRALEY
INVENTOR.
BY
ATTORNEY

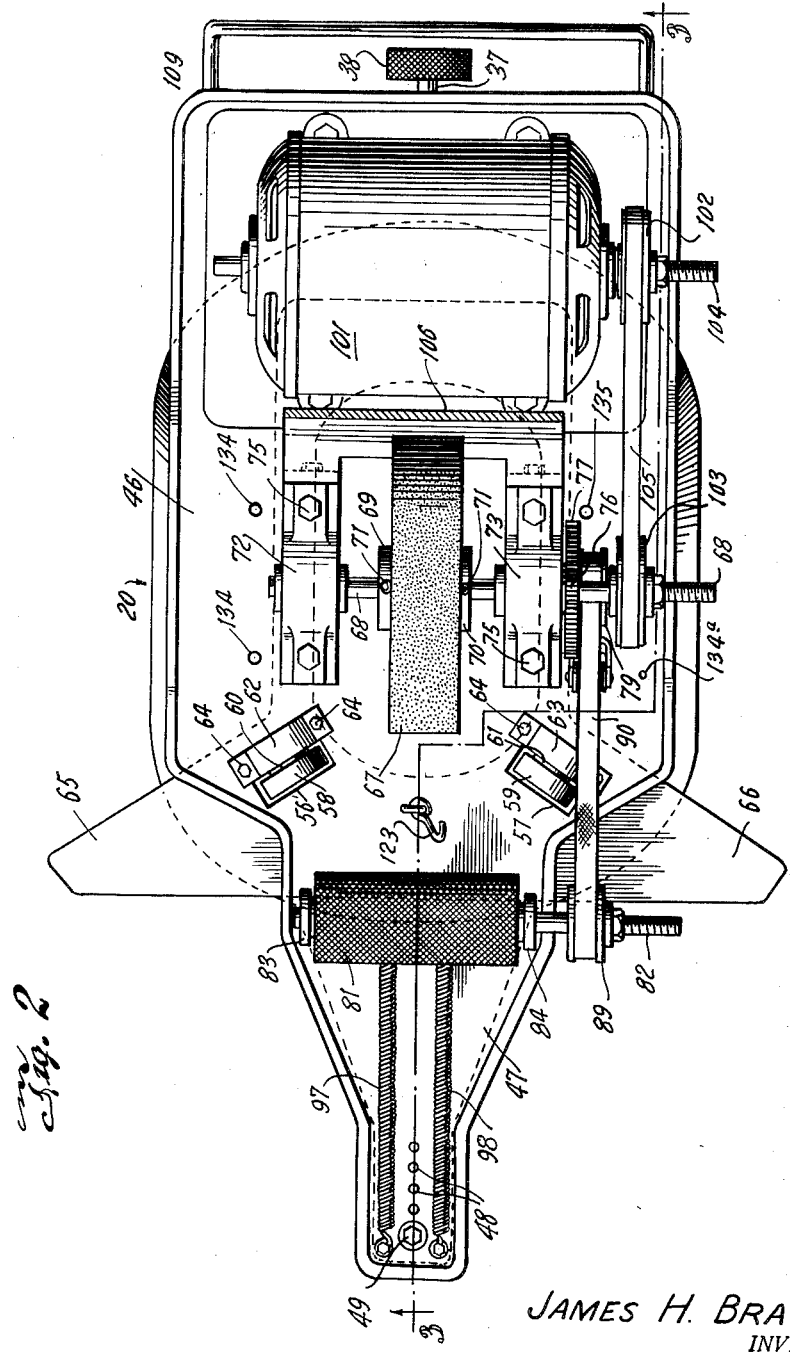

Sept. 15, 1953　　　　J. H. BRALEY　　　　2,651,893
TIRE SHAPING MACHINE
Filed June 16, 1950　　　　　　　　　　　　5 Sheets-Sheet 3
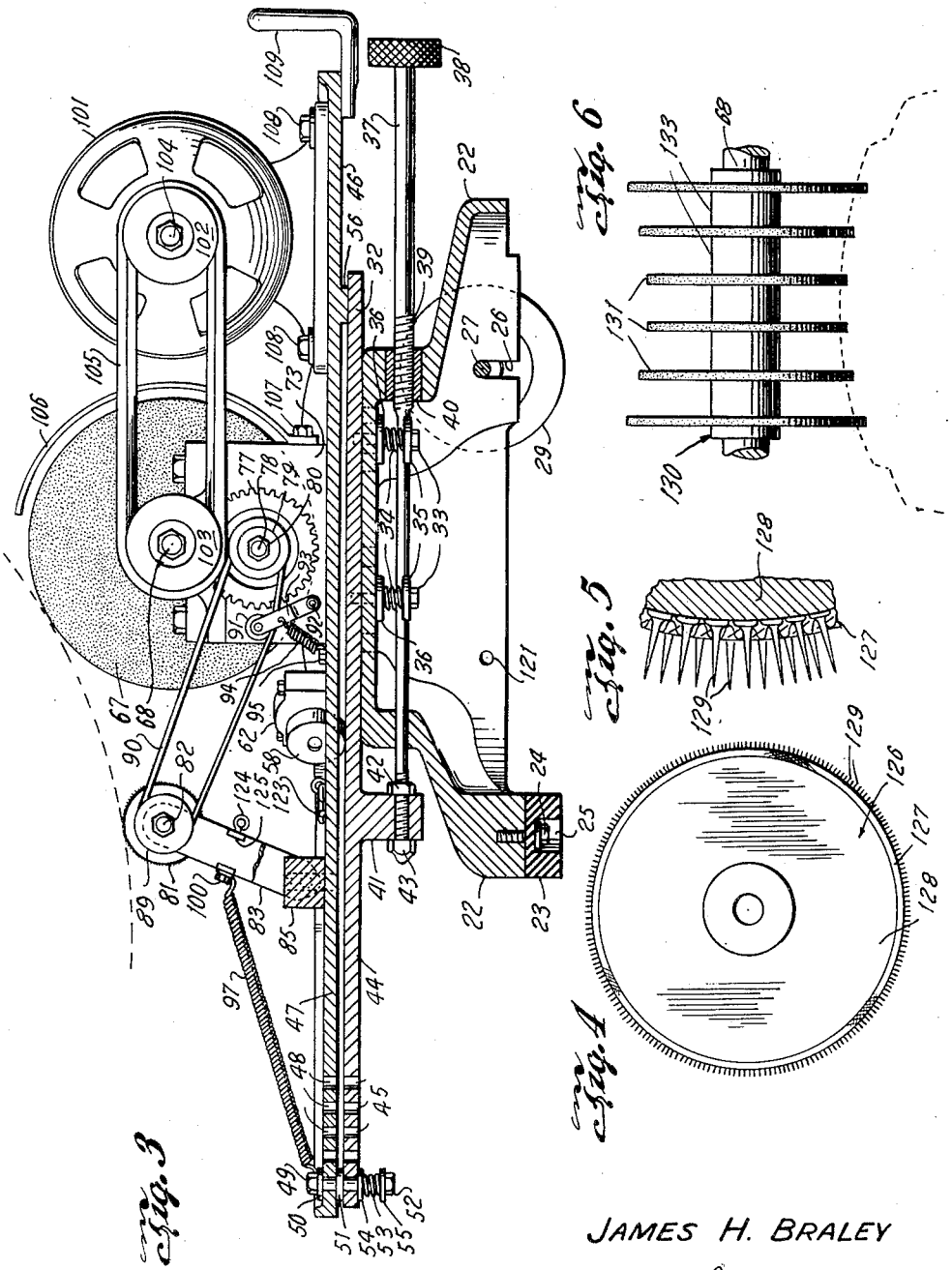
JAMES H. BRALEY
INVENTOR.
ATTORNEY

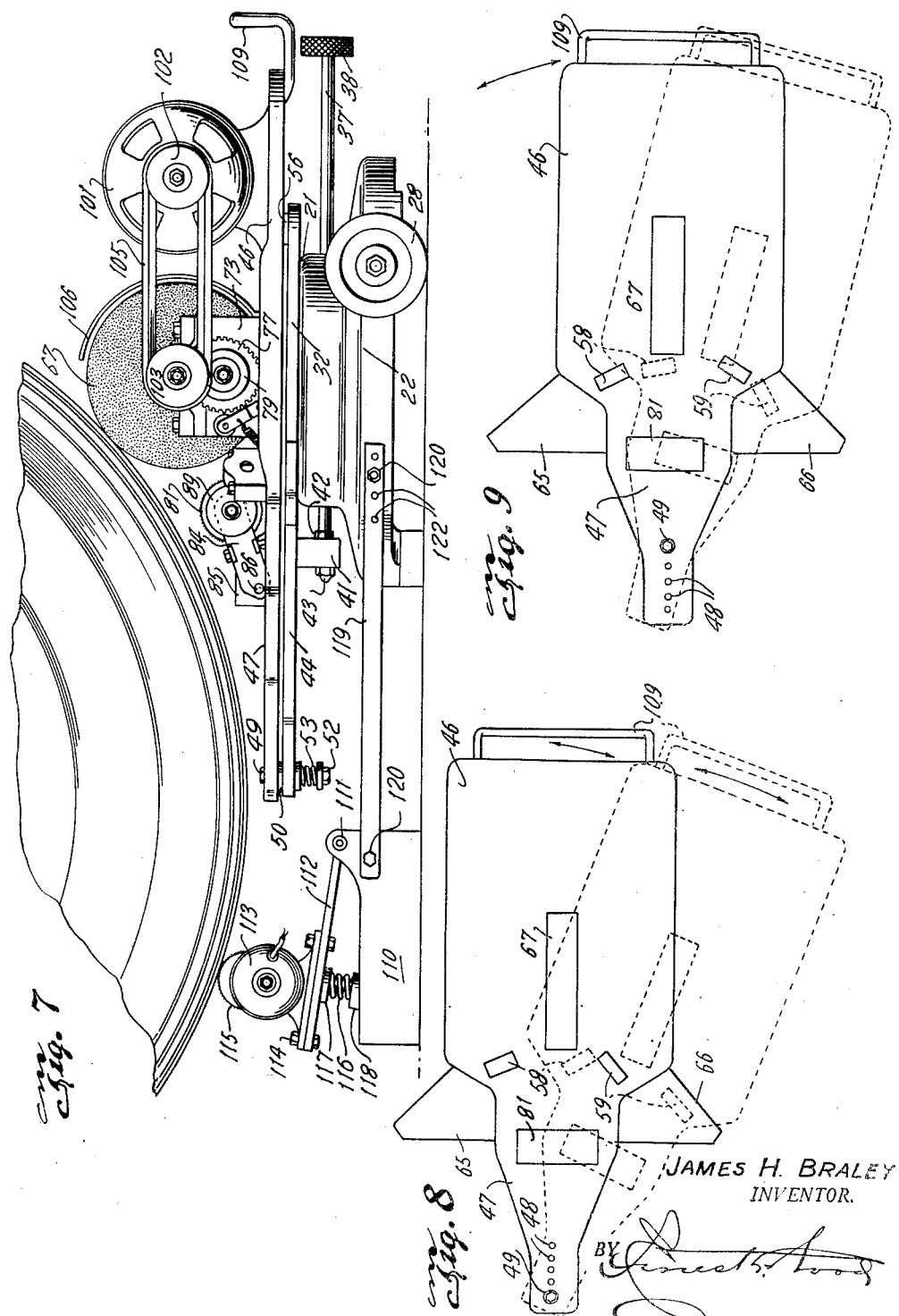

Sept. 15, 1953　　　　J. H. BRALEY　　　　2,651,893
TIRE SHAPING MACHINE

Filed June 16, 1950　　　　　　　　　　　　5 Sheets-Sheet 5

JAMES H. BRALEY
INVENTOR.

ATTORNEY

Patented Sept. 15, 1953

2,651,893

UNITED STATES PATENT OFFICE 2,651,893

TIRE SHAPING MACHINE

James H. Braley, Sacramento, Calif.

Application June 16, 1950, Serial No. 168,580

6 Claims. (Cl. 51—179)

My invention relates to tire shaping machines and more particularly to such machines which shape the tire while it is mounted on the vehicle on which it is to be used.

It is found that many new tires are not uniform in radius at all points along their circumference, there being "lobes" of excess rubber at some points along the circumference. Since such tires are not perfectly round and in addition are heavier at some points than others, the unbalance of such tires causes unnecessary, and annoying, vibration of the vehicles on which such tires are mounted. In order to correct the unbalance of such tires with a minimum expenditure of labor and time, it is desirable that the tire shaping machine employed to remove the excess rubber from such tires operate on the tires while they are mounted on the wheels of the vehicle.

Accordingly, it is an object of my invention to provide a new and improved tire shaping machine.

It is another object of my invention to provide a new and improved tire shaping machine to remove excess rubber from the tire to make the tire uniform in radius at all points along its circumference.

It is another object of my invention to provide a new and improved tire shaping machine which shapes tires while they are mounted in operative position on a vehicle.

It is still another object of my invention to provide a new and improved tire shaping machine which can be adjusted to shape tires of varying sizes.

Briefly stated, the new and improved tire shaping machine of my invention comprises a base on which is mounted an elongated bearing plate. An adjusting means is provided to permit longitudinal displacement of the bearing plate relative to the base. Pivotally secured to one end of the bearing plate is a carriage plate on which are mounted a rotary tire shaping tool, such as a wheel of Carborundum, a tire revolving member, and a motor for rotating the tool and the revolving member in opposite directions, one rotating in a clockwise direction and the other in a counter-clockwise direction. The tire shaping machine is placed beneath the tire of a vehicle which is jacked-up to lift the tire off the ground, the outer periphery of the tire contacting the tire revolving member which revolves the tire and the wheel on which the tire is mounted. The bearing plate is then displaced longitudinally until the tool contacts the tire. Since the contacting surfaces of the tool and the tire move in opposite directions, the tool will remove rubber from the tire at the points along the periphery of the tire at which the tool contacts the tire. In order to shape the outer periphery of the tire to have a surface conforming to an arc concentric with respect to an axis normal to the axis of rotation of the wheel, the carriage plate is moved about the point at which is pivotally secured to the bearing plate, the tool describing an arc having the pivot point as its center. An adjusting means is provided to move the point to change the radius of the arc to accommodate tires of various sizes. For exceptionally large tires, the tire revolving member may be powered by an additional motor and be secured to the base by an extension in order to increase the distance between the tire revolving member and the tool. If desired a rubber stripping disc may be employed instead of the Carborundum tool to strip the rubber from the outer periphery of the tire preparatory to treading the tire. In another embodiment of my invention, a plurality of spaced Carborundum impregnated discs may be mounted on the carriage plate to cut grooves in a retreaded tire.

For a better understanding of my invention reference may be had to the following description taken in connection with the accompanying drawing and its scope will be pointed out in the appended claims.

In the drawing,

Figure 1 is a perspective view of a preferred embodiment of the tire shaping machine;

Figure 2 is a top plan view of the device illustrated in Figure 1;

Figure 3 is a sectional view of the device taken on line 3—3 of Figure 2;

Figure 4 is a side elevation of a rubber stripping disc;

Figure 5 is a sectional view of a portion of the disc illustrated in Figure 4;

Figure 6 is a front elevation of a tire grooving tool;

Figure 7 is a side elevation of the device illustrated in Figure 1 showing an attachment employed in shaping tires of large size;

Figures 8 and 9 are schematic views of the carriage and bearing plates illustrating the change in the radius of the arc described by the carriage plate, and therefore by the tool mounted on the carriage plate, when the point of pivot is changed;

Figure 10 is a top plan view of the base showing the normal position of the bearing plate in broken lines.

Figure 11:
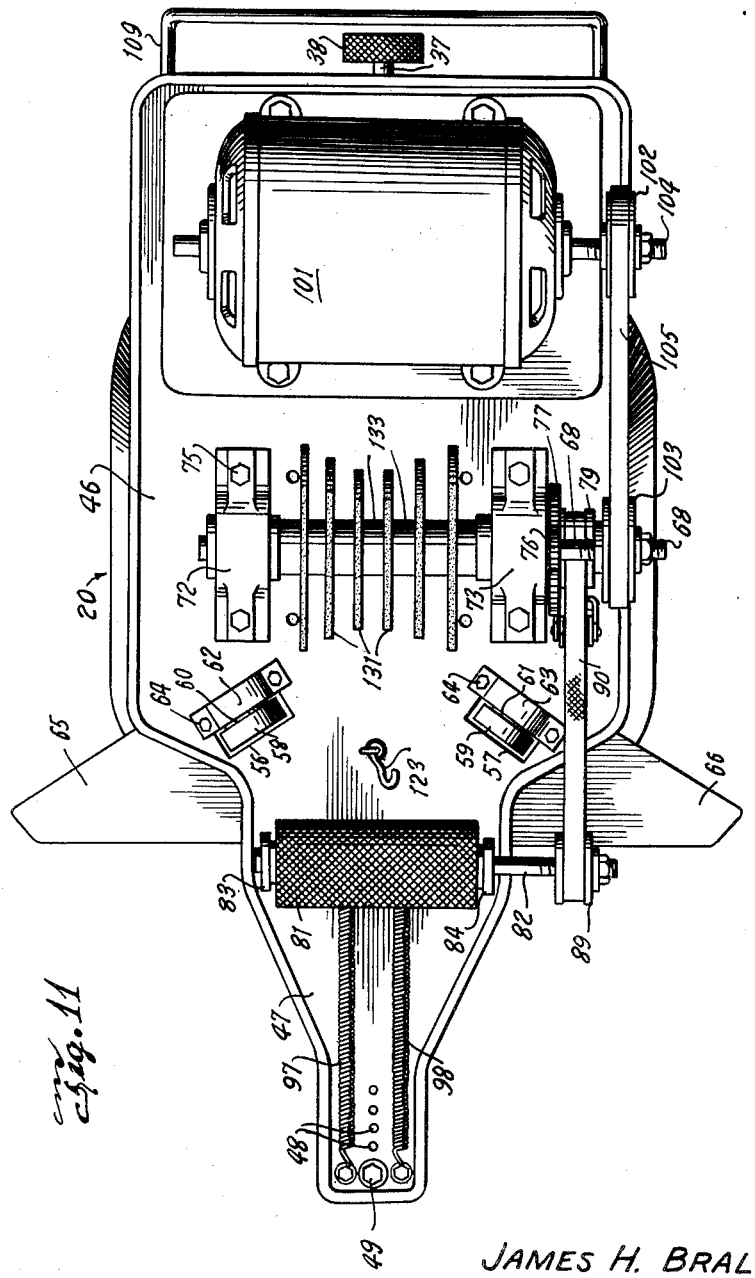
Figure 11 is a top plan view of the device of Figure 1 as adjusted for use with the grooving attachment illustrated in Figure 6.

Referring now especially to Figures 1 to 3 and 10, the preferred embodiment of my invention there illustrated comprises a base 20 having a level top 21 and an outwardly flared depending flange 22. The front portion of flange 22 is provided with a foot 23 which is secured to flange 22 by means of bolts 24, one of which is shown in Figure 3, which lie in recesses 25 in foot 23 and engage tapped holes provided in flange 22. The rear side portions of flange 22 are provided with slots 26, one of which is shown in Figure 3, which receive the axle 27 on whose opposite extremities are rotatably secured the wheels 28 and 29. It will be apparent that by lifting the front end of base 20 it can be caused to be supported on wheels 28 and 29 and can therefore be easily moved from one location to another. When foot 23 is lowered to contact the ground, base 20 will rest immovably on the ground.

The top 21 of base 20 is provided with three rectangular apertures 30 in which are received the downwardly projecting lugs 31 of a bearing plate 32. The lugs 31 are of approximately the same width as apertures 30 but are of lesser length to permit longitudinal movement but prevent transverse movement of bearing plate 32 relative to base 20. Bearing plate 32 is yieldingly secured to base 20 by means of bolts 33 whose ends are engaged in suitable threaded apertures in lugs 31. Compressed springs 34 bear against the washers 35 and 36 through which bolts 33 pass. The washers 36 are greater in diameter than the width of apertures 30 and abut the lower surface of top 21 adjacent the apertures 30.

In order to provide for selective longitudinal adjustment of bearing plate 32 with respect to base 20, I provide a rod 37 having a knurled knob 38 on one end and having an intermediate portion threaded as at 39. The threaded portion 39 is engaged in the tapped bearing 40 which is rigidly secured to the rear portion of flange 22 while the forward portion of rod 37 extends through a suitable aperture in the front portion of flange 22. The front end of rod 37 is threaded and passes through an aperture in a downwardly extending lug 41 of bearing plate 32. The nut 42 and cap nut 43 screwed on the front end of rod 37 abut opposite sides of lug 41 so that when rod 37 is rotated, nut 42 or cap 43 will exert a force on lug 41 to move bearing plate 32 in one or the other longitudinal directions relative to base 20.

Bearing plate 32 has a forwardly extending projection 44 which is provided with a plurality of spaced apertures 45. A carriage plate 46 is also provided with a forward extension 47 having a plurality of similarly spaced apertures 48. A bolt 49 which passes through a pair of registering apertures 45 and 48 pivotally secures carriage plate 46 to bearing plate 32. A washer 50 is interposed between the head of bolt 49 and carriage plate 46 while a spacing washer 51 is interposed between plates 32 and 46. A nut 52 and bolt 49 maintain a spring 53 between washers 54 and 55. Spring 53 yieldingly urges plates 32 and 46 toward each other. Carriage plate 46 also has a flange 56 of the same thickness as spacing washer 51 which serves to support the rearmost portion of carriage plate 46 on bearing plate 32. It will be apparent that the yielding action of spring 53 makes possible movement of carriage plate about bolt 49 and relative to bearing plate 32.

Carriage plate 46 is provided with a pair of apertures 56 and 57 through which pass wheels 58 and 59, respectively. Wheels 58 and 59 are rotatably mounted on shafts 60 and 61, respectively, which are journaled in bearing blocks 62 and 63, respectively. Bearing blocks 62 and 63 are rigidly secured to carriage plate 46 by means of bolts 64 whose lower ends engage in suitable tapped apertures in carriage plate 46. Wheels 58 and 59 rotate on lateral extensions 65 and 66 of bearing plate 32 to help support carriage plate 46 and the structures mounted upon it as it is pivoted about bolt 49.

A tool, such as the Carborundum wheel 67, is rigidly secured to a shaft 68 by means of collars 69 and 70 which may be secured to shaft 68 in any conventional manner as by Allen screws 71. The shaft 68 is journaled in bearing blocks 72 and 73 which are rigidly secured to carriage plate 46 by means of bolts 75 whose lower threaded ends are engaged in suitable tapped apertures in carriage plate 46. Also rigidly secured to shaft 68 is a gear 76 which meshes with a gear 77 rigidly secured to a shaft 78. Shaft 78 has one end journaled in a suitable aperture in bearing block 73 while a pulley 79 is rigidly secured to the other end by any suitable means, for example, a nut 80.

A knurled roller 81, which acts as a tire revolving member, is rigidly secured to a shaft 82 which is journaled in supporting members 83 and 84 whose lower ends are pivotally secured to a block 85 by bolts 86', one of which can be seen in Figure 1. Block 85 is fastened to carriage plate 46 by Allen screws 86. Rigidly secured to shaft 82, by means of a nut 87 and washer 88, is a pulley 89. A belt 90 passes around pulley 89 and 70 and is kept tight by a roller 91 rotatably mounted on a pin 92 of a bifurcated bracket 93 whose lower end is pivotally secured to bearing block 73. A spring 94 having one end secured to carriage plate 46 by a bolt 95 and the other end to bracket 93 biases roller 91 away from bearing block 73 to maintain belt 90 taut about pulley 70 and 89.

Supporting members 83 and 84 are connected by a strip 96 and are biased to a position remote from wheel 67 by springs 97 and 98 whose opposite ends are secured to carriage plate 46 by means of studs 99 and to strip 96 by studs 100.

Shaft 68 is turned by motor 101 by means of pulleys 102 and 103 on shafts 104 and 68, respectively, and belt 105. It will be apparent that as the motor shaft 104 rotates, shafts 68, 78 and 82 will also be rotated to rotate roller 81 and wheel 67. A guard 106 may be mounted on bearing blocks 72 and 73 by means of bolts 107. Motor 101 is secured to carriage plate 46 by bolts 108.

In operation, the above described tire shaping machine is placed beneath the wheel of a vehicle which has been jacked-up so that the tire on the wheel is out of contact with the ground and so that the wheel is free to rotate on its axle. The roller 81, which is knurled to obtain more traction on the tire, engages the outer periphery of the tire which is indicated by the broken curved line in Figure 3. Springs 97 and 98 yieldingly urge roller 81 into contact with the tire. Since roller 81 is driven by motor 101, it forces vehicle wheel to rotate. The knurled knob 38 of rod 37 is then rotated to advance wheel 67 gradually toward the tire. Since the tire is rotating the high spots, or lobes of excess rubber on the outer periphery of the tire, will first come in contact with the Carborundum wheel 67. Since this wheel rotates in the opposite direction from the direction of rotation of the tire, wheel 67 being of abrasive character will remove the excess rubber from these high spots. At the same time carriage plate 46 is pivoted back and forth about bolt 49 so that wheel 67 will come into contact with all high spots on the outer periphery of the tire. It will be noted that wheel 67 will move about an arc having as its center the bolt 49. If the swinging of the wheel 67 about the bolt 49 does not produce an arc corresponding to a section of the tire taken in a plane in which the point of contact of the grinding wheel and tire moves, the feed screw 37 may be adjusted to maintain the wheel in contact with the tire. Since the transverse curvature of different sized tires vary, the radius of this arc may be varied to suit different sized tires by moving bolt 49 into different registering pairs of apertures 45 and 48 as is illustrated in Figures 8 and 9. Figure 3 illustrates the position of bolt 49 for a large tire while Figure 9 illustrates the position of bolt 49 for a small tire. To facilitate the pivotal movement of carriage plate 46 a handle 109 is secured to carriage plate 46 by welding or any other suitable means. The rod 37 is rotated and Carborundum wheel 67 is advanced toward the tire until wheel 67 barely touches the tire throughout its periphery as the tire revolves. The tire will then be round and well balanced and the vibration of the wheel caused by the unbalance of the tire due to the lobes of excess rubber will cease.

It will be apparent that the tire shaping machine will automatically adjust itself to tires of varying diameters since roller 81 is pivotally mounted on block 85 and roller 91 will maintain belt 90 taut regardless of the position of roller 81. When very large tires are to be shaped, however, the attachment illustrated in Figure 7 is employed. The attachment comprises a base 110 on which is mounted for pivotal movement about a shaft 111 a plate 112. A motor 113 is secured to plate 112 by bolts 114 and is provided with a roller 115, similar to roller 81, which is biased upwardly against the tire by a spring 116 which is interposed between plate 112 and base 110 and whose opposite ends are secured in collars 117 and 118. The motor 113 may be provided with suitable reduction gears, not shown.

The base 110 is attached to base 20 by means of a pair of bars 119, one of which can be seen in Figure 7. A bolt 120 secures one end of each bar 119 to base 110 while the other end is secured to base 20 by a bolt 120 which passes through registering apertures 121 and 122 in flange 22 and bar 119, respectively. Bar 119 is provided with a plurality of apertures 122 to accommodate the machine to various sized tires. When the auxiliary motor 113 is employed, roller 81 is maintained in the position shown in Figure 7 by a latch 123 which engages an eyebolt 124 secured to a strip 125 mounted on supporting members 83 and 84.

The tire shaping machine may also be employed to strip the rubber of the tire down to the fabric carcass preparatory to retreading the tire. In this case the wheel 67 is replaced by a spiked disc 126 which may comprise a peripheral band of belting 127 attached to a central disc 128 and through which are driven the spikes 129, the heads of the spikes 129 being held between the central disc 128 and the band 127. Since the retreaded tire must be grooved, I provide a tool 130 which consists of a plurality of rubber discs 131 impregnated with Carborundum and secured in spaced relation to a shaft 68. Collars 133 are employed to space disc 131 and maintain them in proper position on shaft 68. Allen screws, not shown, may be employed to secure the collars 133 on shaft 68.

During the grooving operation, the carriage plate 46 may not be rotated. Since the grooving tool 130 is wider than either wheel 67 or disc 126, the bearing blocks 72 and 73 must be moved further apart. Additional tapped apertures 134 and 135 are provided in carriage plate 46 so blocks 72 and 73 may be moved outwardly when tool 130 is to be employed. Since this will result in outward displacement of all gears and pulleys, shafts 68, 82 and 104 must be made sufficiently long, where tool 130 may be employed, to enable the pulleys 78 and 89, and the pulleys 102 and 103 to be maintained in line. Figure 11 illustrates the position of tool 130 in the tire shaping machine. An additional tapped aperture 134a must also be provided for the bolt 105 which secures one end spring 94 to carriage plate 46.

While I have shown and described particular preferred embodiments of my invention it will be apparent to those skilled in the art that various changes and modifications can be made without departure from my invention and I, therefore, aim in the appended claims to cover all such changes and modifications as fall within the true spirit and scope of my invention.

What is claimed is:

1. A tire shaping machine comprising a base having a longitudinal axis; a bearing plate slidably mounted on said base for movement parallel to said longitudinal axis; means connected to said base and said bearing plate for selectively slidably moving said bearing plate parallel to said longitudinal axis; a carriage plate on said bearing plate pivotally secured to said bearing plate for pivotal movement about a vertical axis; a supporting member mounted on said carriage plate for pivotal movement about a horizontal axis; a resilient member biasing said supporting member to an upper position; a tire revolving member mounted on said supporting member for rotary movement about a horizontal axis parallel to said first mentioned horizontal axis; a tire shaping tool mounted on said carriage for rotary movement about a horizontal axis parallel to said first mentioned horizontal axis; and a motor on said carriage plate connected to said tire revolving member and said tire shaping tool for simultaneously revolving said revolving member and and said tool in opposite directions about said horizontal axes.

2. A tire shaping machine comprising a base; a bearing plate slidably mounted on said bearing plate; a carriage plate pivotally secured to said bearing plate for pivotal movement about a vertical axis; a tire revolving rotary member pivotally mounted on said carriage plate and adapted to revolve a tire about a first horizontal axis in one direction; a tire shaping tool mounted on said carriage plate for rotary movement in a direction opposite to said one direction about a second horizontal axis parallel to said first horizontal axis; means connected to said bearing plate and said base for moving said tool toward the outer periphery of the tire disposed above, engaged and revolved by said tire revolving rotary member; resilient means mounted on said carriage plate and connected to said tire revolving member for upwardly biasing said tire revolving member; and means mounted on said carriage plate and connected to said tire revolving rotary member and to said tool for simultaneously rotating said tire revolving rotary member and said tool, said first horizontal axis being disposed between said vertical axis and said second horizontal axis.

3. A tire shaping machine comprising a base; a bearing plate slidably mounted on said base; a carriage plate pivotally secured to said bearing plate for pivotal movement about a vertical axis; a tire revolving rotary member pivotally mounted on said carriage plate and adapted to revolve a tire about a first horizontal axis in one direction; an abrasive wheel mounted on said carriage plate for rotary movement in a direction opposite to said one direction about a second horizontal axis parallel to said first horizontal axis; means connected to said bearing plate and said base for moving said abrasive wheel toward the outer periphery of the tire disposed above, engaged and revolved by said tire revolving rotary member; a resilient member mounted on said carriage plate and connected to said tire revolving member for biasing upwardly said tire revolving member; and means mounted on said carriage plate and connected to said tire revolving rotary member and to said tool for simultaneously rotating said tire revolving rotary member and said tool, said first horizontal axis being disposed between said vertical axis and said second horizontal axis.

4. In a tire shaping machine adapted to be disposed beneath the raised wheel of a vehicle provided with a base; a carriage plate mounted on said base for pivotal movement about a vertical axis; a supporting member pivotally mounted on said carriage plate; a tire revolving rotary member rotatably mounted on said supporting member and adapted to contact said tire; a resilient member connecting said carriage plate and said supporting member for biasing said tire revolving rotary member to an upper position; a tire shaping tool rotatably mounted on said carriage plate and adapted to contact the outer periphery of said tire; means mounted on said carriage for simultaneously rotating said tire revolving rotary member and said tool; and means connected to said carriage plate for moving said carriage plate and said tool toward said outer periphery of said tire; said tool moving in an arc about the outer periphery of said tire and transversely with respect to said periphery when said carriage plate is moved pivotally about said vertical axis.

5. In a tire shaping machine adapted to be disposed beneath the raised wheel of a vehicle which is provided with a tire: a base; a bearing plate mounted on said base for horizontal movement perpendicular to the central axis of said wheel; a carriage plate on said bearing plate pivotally secured to said bearing plate for horizontal movement about a vertical pivot; a tire engaging member mounted on said carriage plate for rotary movement about a first horizontal axis; a tire shaping tool mounted on said carriage for rotary movement about a second horizontal axis parallel to said first horizontal axis, said member and said tool being adapted to contact the outer periphery of said tire; and a motor on said carriage plate connected to said member and to said tool for simultaneously rotating said member and said tool in opposite directions about said horizontal axes, said first horizontal axis being disposed between said vertical pivot and said second horizontal axis.

6. In a tire shaping machine adapted to be disposed beneath the raised wheel of a vehicle which is provided with a tire: a base, a bearing plate mounted on said base for horizontal movement perpendicular to the central axis of said wheel; a carriage plate on said bearing plate pivotally secured to said bearing plate for horizontal movement about a vertical pivot; a tire engaging rotary member rotatable about a first horizontal axis pivotally mounted on said carriage plate; a resilient member mounted on said carriage plate for biasing said tire engaging member toward an upper position; a tire shaping tool mounted on said carriage for rotary movement about a second horizontal axis parallel to said first horizontal axis, said member and said tool being adapted to contact the outer periphery of said tire; and a motor connected to said member and to said tool on said carriage plate for simultaneously rotating said member and said tool in opposite directions about said horizontal axes, said first horizontal axis being disposed between said vertical pivot and said second horizontal axis.

JAMES H. BRALEY.

References Cited in the file of this patent

UNITED STATES PATENTS

| Number | Name | Date |
| --- | --- | --- |
| 1,489,922 | Brundage | Apr. 8, 1924 |
| 1,561,861 | Kmentt | Nov. 17, 1925 |
| 1,995,304 | Hallam | Mar. 26, 1935 |
| 2,000,129 | Dunnam | May 7, 1935 |
| 2,245,728 | Sipe | June 17, 1941 |
| 2,262,596 | Watkins | Nov. 11, 1941 |
| 2,466,478 | Riley | Apr. 5, 1949 |

FOREIGN PATENTS

| Number | Country | Date |
| --- | --- | --- |
| 514,221 | Germany | Dec. 9, 1930 |